United States Patent [19]

Martini

[11] Patent Number: 4,846,209

[45] Date of Patent: Jul. 11, 1989

[54] SCUTTLE VALVE

[75] Inventor: Leonard J. Martini, San Diego, Calif.

[73] Assignee: The United States of America as represented by the Secretary of the Navy, Washington, D.C.

[21] Appl. No.: 120,434

[22] Filed: Nov. 13, 1987

[51] Int. Cl.⁴ .............................................. F16K 31/00
[52] U.S. Cl. ..................................... 137/68.2; 114/198
[58] Field of Search .................. 137/68.2, 70; 114/198

[56] References Cited

U.S. PATENT DOCUMENTS

| | | | |
|---|---|---|---|
| 551,473 | 12/1895 | Perkins | 114/198 |
| 3,983,892 | 10/1976 | Hardesty | 137/68.2 |
| 4,248,257 | 2/1981 | Hardesty | 137/68.2 |
| 4,340,077 | 7/1982 | Schiffer et al. | 137/68.2 |
| 4,388,940 | 6/1983 | Powell | 137/70 |

FOREIGN PATENT DOCUMENTS 2465140  3/1981  France ................ 137/68.2

Primary Examiner—John Fox
Attorney, Agent, or Firm—Harvey Fendelman; Thomas Glenn Keough; Michael A. Kagan

[57] ABSTRACT

A scuttle valve is provided for flooding a torpedo. The scuttle valve includes a housing which is fitted through the hull of the torpedo. The housing has a bore which when vacant, serves as a port to enable water to enter the torpedo. A piston is slidably mounted within the bore of the housing and is spring biased towards the interior of the torpedo. An explosive bolt which is threaded into the piston extends through a tapered plate which cams a retainer ring across the interior end of the piston and into an interior annular recess in the housing to restrain the piston within the bore. When the explosive bolt is actuated the bolt breaks and the retainer ring contracts to allow the spring to force the piston into the interior of the torpedo. Thus, water enters through the open bore of the housing and floods the torpedo.

9 Claims, 2 Drawing Sheets

4,846,209

SCUTTLE VALVE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

A considerable number of practice torpedoes are used for exercise purposes. A torpedo is designed to surface after it has made its run so that it can be retrieved and utilized again for other practice exercises. However, locating practice torpedoes at sea is often a difficult task. If an expended torpedo cannot be located within a specific period of time, it must be scuttled by use of a scuttle valve to prevent it from becoming a hazard to shipping.

One type of scuttle valve described in U.S. Pat. No. 3,763,512 utilizes an outwardly ejecting piston. The piston is jettisoned from a hull, enabling ocean water to enter, and cause the vessel to become negatively buoyant and sink. However, hydrostatic pressure can inhibit effective ejection of the piston. External hull damage or ocean borne debris can prevent ejection. Outwardly ejecting pistons pose a risk of serious bodily injury to persons involved in the manufacture, transport, and handling of torpedoes utilizing this type of scuttle valve if the piston ejects prematurely.

Another type of scuttle device uses soluble plugs as described in U.S. Pat. Nos. 3,308,046 and 3,605,416. This type of plug is made of a sacrificial metal such as magnesium or aluminum and is used to provide a watertight seal. The plugs chemically react when exposed to sea water and are destroyed, allowing sea water to enter and sink a vessel.

Thus there is a continuing need to improve the state of the art to develop a scuttle valve that is inherently reliable and does not pose a hazard to associated personnel.

SUMMARY OF THE INVENTION

The present invention provides an electrically actuated, inwardly biased piston which makes scuttle valve operation reliable and independent of hydrostatic pressure at a specific time after a torpedo is released. Furthermore, the present invention prevents the risk of serious bodily injury. A housing having a through bore is mounted in the hull of the torpedo. A top opening of the bore is flush with the surface of the torpedo and a piston is slidably mounted within the bore to create a watertight seal. The purpose of the bore is to provide a conduit for water to enter the torpedo when the piston is displaced into the torpedo interior. A spring within the bore biases the piston towards the torpedo interior. An expandable split retaining ring fits within an annular groove provided in the wall of the bore and restrains the piston against the force of the spring when a retaining plate having a tapered surface cams the split retaining ring to expand within the groove. An explosive bolt extends through the retaining plate and threads into the piston to hold the split retaining ring within the groove. A battery operated electric timer actuates the explosive bolt after a predetermined period of time. Then, the split retaining ring resiliently forces the retaining plate towards the interior of the torpedo allowing the ring to retract to permit the compressed spring to expand and force the piston into the torpedo interior. The scuttle valve is extremely light and compact and does not interfere with the operation of the torpedo.

OBJECTS OF THE INVENTION

An object of the present invention is to overcome the aforementioned problems associated with prior art scuttle valves.

Another object of the invention is to provide a scuttle valve which is compact and does not interfere with operation of the torpedo.

A further object is to provide a scuttle valve which is simple to manufacture.

A further object is to provide a scuttle valve with good reliability.

A further object is to provide scuttle valve which is safe to transport and handle.

Another object of the invention is to provide a scuttle valve that can be triggered within a precise time period.

Yet another object of the invention is to provide a scuttle valve which operates independently of depth pressure.

These and other objects of the invention will become apparent from the following detailed description of the invention when considered in conjunction with the accompanying drawings.

DESCRIPTION OF THE PREFERRED EMBODIMENTS

Figure 1:
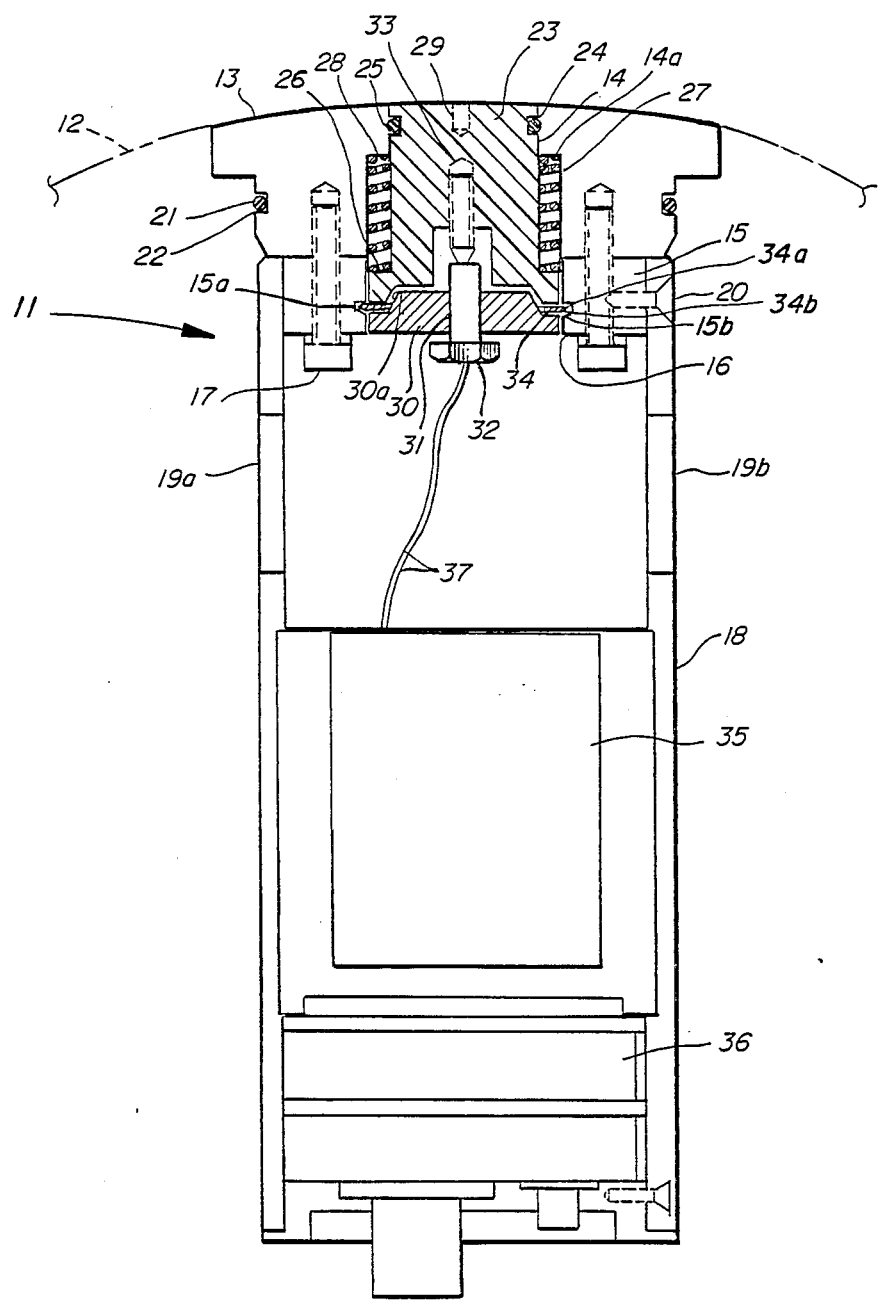
FIG. 1 shows a cross-sectional view of the scuttle valve operationally disposed in a torpedo.

Referring now to the drawings wherein like reference numerals designate like or similar part throughout the several views there is illustrated in FIG. 1 a scuttle valve 11 for flooding a torpedo 12, the torpedo being illustrated in phantom.

Figure 2:
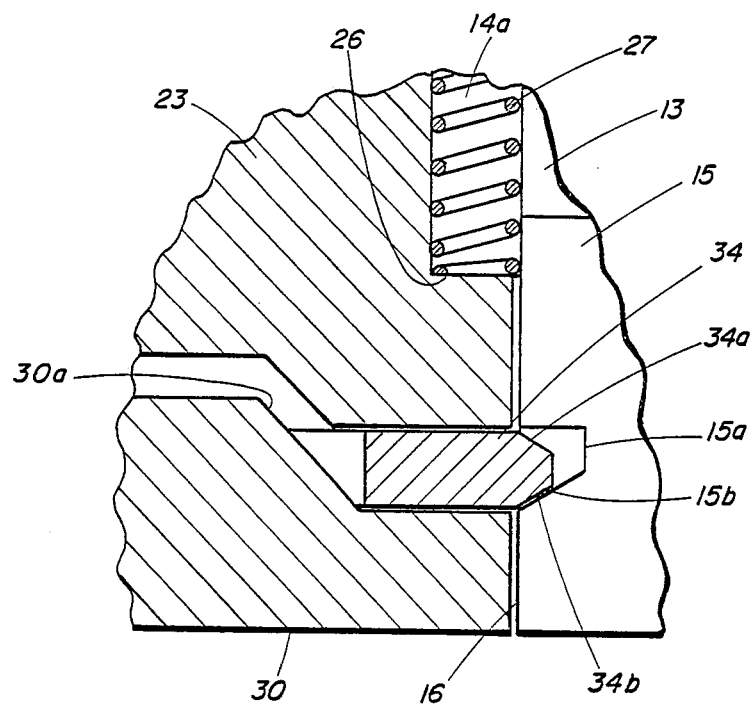
FIG. 2 is an enlarged cross-sectional view of the retaining ring supporting the piston.

The scuttle valve includes a housing 13 provided with coaxially aligned and juxtaposed cylindrical bores 14 and 14a. The housing is sized to fit the scuttle valve to the torpedo. A cylindrical housing extension 15 having a bore 16 coaxially aligned with and juxtaposed to bore 14a of the housing is connected to the housing by a plurality of screws 17. As shown in FIG. 2, the extension has a groove 15a having a tapered annular land 15b in communication with bore 16. Although the housing and housing extension are described as two separate components, they could be appropriately made as an integral unit.

Referring to FIG. 1, a support frame 18 having apertures 19a and 19b is fastened to the housing extension by a plurality of screws 20. The purpose of the support frame will be discussed more fully herein. A first "O"-ring 21 fits within an annular groove 22 in the housing and provides a watertight seal between the torpedo and the housing.

A cylindrical piston 23 is sized to slidably mount within bores 14, 14a, and 16. One end of the piston is shaped with an annular groove 24 around its external periphery. A second "O"-ring 25 fits within groove 24 to provide a watertight seal between the piston and the housing.

The piston is provided with an annular land 26. A compression spring 27 circumjacently fits around piston 23 between annular land 26 and an annular shoulder 28 within the coaxially aligned bores 14a and 16. The spring exerts a force biased to drive the annular land 26 towards the interior of the torpedo and hold the piston such that a top surface 29 of piston 23 is maintained flush with the surface of the torpedo.

A circular retainer plate 30 having a frustum shaped surface 30a is releasably connected to the bottom of piston 23. The retainer plate is provided with a bore 31. An explosive bolt 32 extends through the retainer plate bore and is threaded into an appropriately threaded bore 33 in the bottom of piston 23. The explosive bolt holds the retainer plate so that surface 30a cams a split retaining ring 34 into annular groove 15a in housing extension 15. As shown in FIG. 2, the retaining ring has annular tapered surfaces 34a and 34b around its external periphery. One of the tapered surfaces rests on tapered annular land 15b in groove 15a, however, two tapered surfaces are provided to facilitate assembly of the scuttle valve. As a consequence, returning to FIG. 1, the split retaining ring prevents piston 23 from being driven toward the interior of the torpedo by the expansive force exerted by spring 27 while compressed between annular land 26 of the piston and annular shoulder 28 of the housing.

A battery pack 35 and electric timing circuit 36 are mounted on support frame 18. The battery pack provides electrical energy to the electric timing circuit. The electrical timing circuit is electrically connected to explosive bolt 32 via wires 37.

OPERATION OF THE INVENTION

In the operation of the invention, battery pack 35 provides electrical energy to electrical timing circuit 36. After a predetermined time after torpedo 12 is expended, the electrical timing circuit provides an electric signal to explosive bolt 32 via wires 37. The resulting explosion severs the explosive bolt. No longer retained by the explosive bolt, referring to FIG. 2, the biasing force exerted by spring 27 acting through annular land 26 of piston 23 on tapered surface 34b of retaining ring 34 causes the ring to slide against tapered annular land 15b. The retaining ring resiliently retracts to thereby cam tapered surface 30a of retainer plate 30 out of the retainer ring and thus return to its unbiased state. In its unbiased state where its outside diameter is less than the inside diameter of groove 15a within housing extension 15, retaining ring 34 no longer resists the biasing force exerted by spring 27 upon annular land 26 of piston 23. Referring to FIG. 1, the biasing force exerted by spring 27 drives piston 23 towards the interior of the torpedo 12. Once the piston is driven out of coaxially aligned bores 14, 14a and 16, ocean water floods the torpedo through the housing and ports 19a and 19b of support frame 18 causing the torpedo to attain negative buoyancy and sink.

Obviously, many modifications and variations of the present invention are possible in the light of the above teaching. It is therefore to be understood that within the scope of the appended claims the invention may be practiced otherwise than as specifically described.

I claim:

1. An apparatus for selectively flooding the interior of a vessel provided with an opening, comprising:
   means sized to fit in the opening of the vessel and configured with an exposed surface that coextends with an outer surface of the vessel for providing a mounting surface having a hole therethrough, said mounting surface providing means having a first bore coaxially aligned with and juxtaposed to a second bore larger than the first bore;
   means disposed in the hole for sealing the interior of the vessel from ambient water, the sealing means comprising a piston slidably mounted within the first bore and the second bore of the mounting surface providing means;
   means operatively disposed with respect to the sealing means for biasing the sealing means toward the interior of the vessel, the biasing means comprising a spring;
   means provided for retaining the sealing means against the biasing means; and
   means releasably engaging the retaining means for selectively releasing the sealing means to enable displacement of the sealing means to the interior of the vessel for the flooding thereof.

2. An apparatus for selectively flooding the interior of a vessel provided with an opening comprising:
   means sized to fit in the opening of the vessel and configured with an exposed surface that coextends with an outer surface of the vessel for providing a mounting surface having a hole therethrough, the mounting surface providing means is provided with a first bore coaxially aligned with and juxtaposed to a second core larger than the first bore, the mounting surface providing means is provided with an annular groove having a tapered annular land in communication with the second bore of the mounting surface providing means;
   means disposed in the hole for sealing the interior of the vessel from ambient water, the sealing means is a piston slideably mounted within the first bore and the second bore of the mounting surface providing means, the piston is provided with a first circular cross-section coaxially aligned with a second circular cross-section larger than the first cross-section;
   means operatively disposed with respect to the sealing means for biasing the sealing means towards the interior of the vessel, the biasing means being a spring;
   means provided for retaining the sealing means against the biasing means including:
   a retaining ring having at least one tapered annular surface around its outer periphery capable of expanding into the annular groove of the mounting surface providing means so that the tapered surface rests on the tapered annular land and the retaining ring being biased to contract to a diameter less than the inside diameter of the annular groove,
   a plate having a tapered surface disposed to cam the retaining ring outwardly into the annular groove in communication with the second bore of the mounting surface providing means,
   an explosive connector extending through the plate to hold the tapered surface of the plate in a camming abutment against the expandable retaining ring and connected to the piston to restrain the piston against the spring; and
   means releasably engaging the retaining means for selectively releasing the sealing means to enable displacement of the sealing means to the interior of the vessel for the flooding thereof, the releasing means including:
   means for selectively energizing the explosive connector.

3. An apparatus according to claim 2 in which the explosive connector is an explosive bolt.

4. An apparatus according to claim 3 in which the energizing means includes an electric timing circuit.

5. An apparatus according to claim 4, in which the energizing means includes a battery mounted on the mounting surface providing means to provide electrical energy to the electric timing circuit.

6. An apparatus according to claim 4, further including:
   a support frame attached to the mounting surface providing means to support the electric timing circuit.

7. An apparatus according to claim 6 in which the support frame has at least one aperture to enable sea water to enter the interior of the vessel.

8. An apparatus according to claims 2, 3, or 4 further including:
   a first resilient sealing member positioned between the mounting surface providing means and the vessel to provide a watertight seal therebetween; and
   a second resilient sealing member positioned between the piston and the mounting surface providing means to provide a watertight seal therebetween.

9. An apparatus according to claim 8 in which the first and second sealing members are "O"-rings.

* * * * *